(12) United States Patent
Jangbarwala (10) Patent No.: US 8,168,068 B2
(45) Date of Patent: May 1, 2012

(54) TREATMENT OF CONTAMINATED WATER STREAMS FROM COAL-BED-METHANE PRODUCTION

(75) Inventor: Juzer Jangbarwala, Chino Hills, CA (US)

(73) Assignee: SET IP Holdings, LLC, Duchesne, UT (US)

( * ) Notice: Subject to any disclaimer, the term of this patent is extended or adjusted under 35 U.S.C. 154(b) by 359 days.

(21) Appl. No.: 12/460,956

(22) Filed: Jul. 27, 2009

(65) Prior Publication Data

US 2010/0096332 A1 Apr. 22, 2010

Related U.S. Application Data

(60) Provisional application No. 61/083,557, filed on Jul. 25, 2008.

(51) Int. Cl.
*B01J 49/00* (2006.01)

(52) U.S. Cl. ......... 210/670; 210/672; 210/676; 210/687

(58) Field of Classification Search .................. 210/670, 210/672, 676, 687
See application file for complete search history.

(56) References Cited

U.S. PATENT DOCUMENTS 5,310,488 A * 5/1994 Hansen et al. ................ 210/674

\* cited by examiner

*Primary Examiner* — Chester Barry
(74) *Attorney, Agent, or Firm* — Marc F. Hankin; Kevin Schraven; Hankin Patent Law, APC (57) ABSTRACT

The present invention is a method for treating contaminated water streams resulting from the production of coal-bed-methane. The method of treating contaminated water streams typically includes the steps of: providing a reaction vessel that contains a bed of weak acid cation ion exchange resin beads; introducing the contaminated water stream to the reaction vessel; allowing for the exchange of hydrogen ions for sodium ions; removing the ion exchanged treated water from the reaction vessel; stopping the stream of contaminated water; and regenerating the weak cation exchange resin.

9 Claims, 8 Drawing Sheets

TREATMENT OF CONTAMINATED WATER STREAMS FROM COAL-BED-METHANE PRODUCTION

CROSS REFERENCE TO RELATED APPLICATIONS

The application is based on U.S. Provisional Application 61/083,557 filed Jul. 25, 2008.

BACKGROUND OF THE INVENTION

1. Field of the Invention

This invention relates to a method for treating contaminated water streams resulting from the production of coal-bed-methane.

2. Description of Related Art

Coal bed methane (CBM) is a name given to the methane gas that is found in coal seams. It is typically produced by non-traditional means, and therefore, while it is sold and used the same as traditional natural gas, its production is different. CBM is generated either from a biological process as a result of microbial action or from a thermal process as a result of increased heat with depth of the coal.

CBM wells are being developed in increasing numbers throughout the United States and other parts of the world. These wells are typically drilled into coal seams and ground water is withdrawn to reduce the hydrostatic pressure on the coal seam. The reduced pressure allows methane gas to migrate to the well bore where it moves to the surface and is collected. Where possible, operators prefer to discharge the ground water into nearby streams, rivers, or other surface water bodies. Depending on the chemical characteristics of this water, different levels of treatment are applied to it before discharge. In some locations, such water cannot be discharged and is instead injected, reused, or evaporated.

CBM water typically has an elevated pH as well as high levels of bicarbonates and sodium. It is not unusual to find CMB water with about 300 to 5000 ppm of bicarbonates and about 200 to 2000 ppm of sodium. Water with these characteristics is detrimental to soil, crops and turf. High bicarbonate/high sodium water is also detrimental because it tends to plug soil pore spaces and thus prevents adequate moisture and nutrients from reaching the root structure of crops and grasses.

With potable water resources in the United States and other parts of the world becoming increasing scarce, an important environmental challenge is to economically treat and utilize CBM water. One method that is currently utilized is to irrigate land with CBM water and subsequently spread sulfur and gypsum on the land in an attempt to counteract the deleterious effects of bicarbonates and sodium. Such a method has several drawbacks. For example, it is difficult to spread gypsum and sulfur on irrigated land in a uniform, consistent, and cost-effective manner—especially during austere weather conditions. Moreover, it is doubtful that such a method effectively solves the problems associated with high bicarbonates and sodium. Spreading sulfur on land that is irrigated with water having high levels of bicarbonate may do little to reduce the level of bicarbonates in soil on a consistent basis. Although research supports the use of gypsum in leaching sodium through the soil profile, the benefit of gypsum is greatly lessened when high levels of bicarbonates are present. Adding calcium via gypsum to soil being irrigated with high-bicarbonate or high-carbonate water can result in the formation of calcium carbonate. Not only does calcium carbonate further aggravate soil problems, but less calcium is available to displace the sodium.

Sodium removal is important for the treatment of these contaminated water streams and can be achieved by various methods. One such method is by ion exchange. There are two types of ion-exchange mechanisms available for water with sodium associated with alkalinity (any alkalinity-OH, $CO_3$, $HCO_3$, etc.)—strong acid cation exchange and weak acid cation exchange. Strong acid cation exchange is typically achieved by exchanging hydrogen ions or protons for the sodium via a sulfonic group on a polystyrene backbone crosslinked with divinylbenze. This type of exchange can split a salt and replace the cation (in this case sodium) with a proton, creating an acid of the anion that is left. Recovery rates are typically only about 85%. Weak acid cation exchange is typically achieved by neutralizing the alkalinity through exchange of the cation associated with the alkalinity (in this case sodium) with a proton, thus producing water or water and $CO_2$. Recovery rates can be as high as 90% and even higher, due to selective behavior and higher capacity.

Reverse osmosis can also be used for removing sodium ions from an aqueous solution. Reverse osmosis has the disadvantage of not being selective. It also requires relatively high pressure on the contaminated water side, resulting in a stream that is essentially a substantially salt-free permeate. Recovery rates vary, but they typically range from about 65% to about 90%, depending on various factors, such as salinity and pressure.

While various methods have been used with limited success in treating contaminated water stream resulting from the production of coal-bed-methane, there remains a need in the art for improved methods from both a technical as well as from an economical point of view.

SUMMARY OF THE INVENTION

In accordance with the present invention there is provided a method for treating a contaminated water stream contaminated with sodium carbonate, sodium bicarbonate, or both, resulting from the production of coal-bed-methane, which method comprising:

a) providing at least one reaction vessel containing a bed of weak acid cation ion exchange resin beads of substantially uniform spherical size wherein the volume of said bed of weak acid cation ion exchange resin occupies about half the volume of the reaction vessel between a top header-lateral distributor and a bottom header-lateral distributor and encompassed by surrounding walls of said vessel, and wherein the space between the resin beads is the void volume;

b) introducing said contaminated water stream, from a contaminated water holding area, into the bottom of said reaction vessel wherein it flows upward through said bottom header-lateral distributor and contacts said ion exchange resin beads at an effective upflow rate sufficient to lift and pack the resin bed against the top header-lateral distributor, and sufficient to result in the exchange of hydrogen ions of the exchange resin for sodium ions of the contaminated water stream, thereby resulting in an ion exchanged treated water stream having a reduced level of sodium ions;

c) conducting said ion exchanged treated water stream from said reaction vessel to a treated water holding area;

d) stopping the flow of the contaminated water stream to said reaction vessel when the ion exchange resin becomes substantially exhausted, thereby resulting in said bed of ion exchange resin containing untreated contaminated water within the void volume of the resin bed;

e) regenerating said bed of weak cation exchange resin by:

i) backwashing said bed of exhausted weak acid cation exchange resin by introducing an effective amount of water from the treated water holding area into the bottom and through the exhausted weak cation exchange resin thereby displacing said untreated contaminated water within the void volume of said resin bed and suspending particulate impurities and resulting in said resin bed containing uncontaminated treated water;

ii) passing the displaced untreated contaminated water and substantially all suspended particulate impurities back to the contaminated water holding area;

iii) providing an ion exchange resin bed volume of acid regenerant solution in a vessel compartmented such that there is a first compartment containing about ⅔ ion exchange resin bed volume of acid regenerant solution and a second compartment containing about a ⅓ ion exchange resin bed volume of acid regenerant solution, which compartments are separated by a vertically disposed weir within the vessel and wherein each compartment contains an inlet port and an outlet port;

iv) introducing into the top of said reaction vessel and into said backwashed bed of exhausted weak acid ion exchange resin, which contains uncontaminated treated water within the void volume of the resin bed, with a first ⅓ resin bed volume of acid regenerant solution from said first compartment, wherein the acid regenerant solution displaces said uncontaminated treated water in the void volume and exchanges hydrogen ions for sodium ions held by the ion exchange resin, thereby resulting in a first ⅓ resin bed volume of acid regenerant containing a high concentration of sodium;

v) conducting said displaced uncontaminated treated water from the bottom of said reaction vessel to said treated water holding area;

vi) introducing a second ⅓ resin bed volume of acid regenerant solution from said first compartment into the top of said reaction vessel and into said resin bed thereby displacing said first ⅓ resin bed volume of acid regenerant solution held within the void volume of said resin bed, which displaced acid regenerant solution contains a high concentration of sodium;

vii) conducting said displaced first ⅓ acid regenerant solution to a waste water holding area;

viii) introducing a third ⅓ resin bed volume of acid regenerant solution from said second compartment of said acid regenerant vessel into the top of said reaction vessel and into said resin bed thereby displacing said second ⅓ acid regenerant solution which occupies the void volume of the resin bed;

ix) conducting said displaced second ⅓ acid regenerant solution into said first compartment of said acid regenerant vessel;

x) introducing a ⅓ resin bed volume of a displacement rinse from said treated water holding area into the top of said reaction vessel and into said resin bed thereby displacing said third ⅓ resin bed volume of acid regenerant that occupied said void volume of the resin bed;

xi) conducting said displaced third ⅓ resin bed volume of acid regenerant to said second compartment of said acid regenerant vessel;

xii) introducing additional ⅓ resin bed volumes of rinse water from said treated water holding area into the top of said reaction vessel and through said resin bed until said resin bed is substantially free of acid regenerant solution:

xiii) restarting the upflow of contaminated water through said regenerated resin bed;

xiv) introducing make-up acid into said first compartment of said acid regenerant solution vessel of sufficient strength and quantity to bring the acid regenerant in said first compartment to a predetermined strength and level for the next regeneration cycle; and xv) repeating steps d and e whenever the resin bed becomes exhausted.

DETAILED DESCRIPTION OF THE INVENTION

The present invention uses ion exchange for selective contaminant removal, particularly for the removal of alkalinity based sodium compounds from contaminated water sources. The production of waste water is minimized and a relatively small amount of acid is required for regeneration of the ion exchange resin compared to conventional ion exchange methods for treating waste water streams.

The method of the present invention is capable of treating water contaminated with sodium carbonates, sodium bicarbonates, or both that result from the production of coal-bed-methane. Recovery of substantially uncontaminated water is maximized and the volume of waste water produced is minimized. Practice of the present invention treats the contaminated water stream to a suitable discharge limit and preferably generates a waste product that can be used as a commercial feedstock. For example, when sulfuric acid is used as the regenerant, the waste water stream resulting from the practice of the present invention will be comprised primarily of sodium sulfate decahydrate (Glauber's salt). This waste water stream, because of it relatively small volume, will be concentrated and thus crystallization/precipitation of sodium sulfate salts can be initiated with minimal evaporation. The resulting wet sodium sulfate salt product can be sold to a third party having a need for the same. Because of the relatively small concentrated form of reusable waste generated by the practice of the present invention, transportation is minimized and acceptability of it as a feedstock by third parties is increased.

Ion exchange resins used in the practice of the present invention are weak acid cation (WAC) resins that are optimized for low levels of waste generation per volume of contaminated water treated. WAC resins are typically made from acrylic polymers crosslinked with divinyl benzene and functionalized with carboxylic acid exchange groups. WAC resins are available as gel type (with microporosity) or macroporous type (with discrete porosity). The macroporous type is preferred. The largely unsaturated structure of the acrylic matrix permits a very high concentration of carboxylic exchange groups. The high internal concentration of exchange groups causes WAC resins to swell very significantly when exchanging (very small) hydrogen for larger ions, such as sodium. For example, WAC resins can expand up to about 100% in volume. This property of WAC exchange resins makes it very difficult for them to be used in currently available minimum waste systems. Applicant hereof has unexpectedly found that by the practice of the present invention a minimum amount of acid regenerant is used and a minimum amount of waste is produced when compared to conventional ion exchange/regeneration systems. For example, conventional practice is to use about 10 resin bed volumes of rinse water after acid treatment of the resin bed and to discard the entire 10 volumes of rinse water. Practice of present invention uses a relatively small amount of rinse water, some of which is recycled. One reason why a relatively small amount of rinse water can be used is because the resin beads used in the practice of the instant invention are of substantially uniform size. The amount of rinse water needed is further reduced by use of the preferred resins of the present invention that will have a substantially solid core with an outer porous active surface layer. Also, weak acid groups such as carboxylic groups are regenerated easily with dilute acids, because of their high preference for protons. The regenerant may be high in salts, but will be able to regenerate the resin beads as long it has the free mineral acidity and a pH level lower than the pKa of the resin. Therefore, practice of the present invention allows for the regeneration of the ion exchange resin with a used acid solution from a previous cycle by adding 105 wt. % to 150 wt. % excess of stoichiometric requirement, until such time that the salts formed are near saturation, then bleeding of ⅓ to 1 bed volume of the regenerant as waste. Typically, at least about 80%, preferably at least about 85%, and more preferably at least about 90% less regeneration waste is generated by the practice of the present invention compared to conventional methods.

It is preferred that the ion exchange resin be a resin with fast kinetics. Preferred resins include those manufactured by Purlolite, located in Bala Cynwyd, Pa., including Purolite SST resins and Purolite C-100-FM resins. These Purolite resins are classified as "Fine Mesh" resins and have relatively small diameter bead sizes that may range from about 16 US mesh to about 70 US mesh. The Purolite SST resins, such as SST-60, have fast kinetics because the ion exchange region is only on the surface of the bead. That is, these resins have a solid core with a porous active outer surface. Such resins are known in the industry as Shallow Shell or Shortened Diffusion Path (SDP) resins. The Purolite C-100-FM resin has fast kinetics because of its small bead size. It is to be understood that the present invention contemplates the use of ion exchange resins having both standard and very fast kinetics, as well as ion exchange resins that are similar or equivalent to the Purolite versions. These resins will be functionalized to function as weak acid cation exchange resins.

Ion exchange vessels capable of containing a column of ion exchange resin are well known in the art. Such vessels, which are also sometimes referred to as ion exchange columns, must: i) contain and support the ion exchange resin, which is preferably in the form of a fixed-bed; ii) substantially uniformly distribute the service and regeneration flow through the resin bed; iii) provide space to fluidize the resin during backwash; and include the piping, valves, and instruments needed to regulate flow of feed, regenerant, and backwash fluids.

A vessel of suitable size is loaded to only about ½ volume capacity with a WAC resin of the present invention. This will allow for volume expansion during the service cycle. It is preferred that the ion exchange resin used in the practice of this invention have beads of substantially uniform size in the range of 1%<40 mesh screen size and 5%>25 mesh screen size. This will allow for the regeneration solution and rinse water to pass through the resin bed without significant obstruction. It is preferred that the contaminated water being treated be introduced into the vessel at relatively high velocities so that the resin bed becomes packed at the top of the vessel and expands downward as the resin expands and becomes exhausted. Flow rates for the contaminated water entering the column will be at effective flow rates. By "effective flow rates" we mean that level of flow rate sufficient to cause the ion exchange resin to be maintained at the top of the vessel during contaminated water flow, as well as being sufficient to result in the exchange of hydrogen ions of the exchange resin for sodium ions of the contaminated water stream. Typically this flow rate will be from about 6 to 12 gallons per square foot of rein vessel surface area, preferably from about 8 to 10 gallons per square foot of rein vessel surface area.

Once the resin bed becomes exhausted and cannot accomplish any further exchange, and has significantly expanded to fill the volume of the resin bed portion of the vessel, it must be regenerated. The resin bed will have a substantially tetrahedral cavity between the beads, equal to about ⅓ of the resin bed volume because the resin beads are substantially uniform in size. Therefore, contaminated water equal to about ⅓ to 1 resin bed volume will be trapped in the voids of the resin bed. This trapped contaminated water will be removed during the first regeneration step, which is a backwash step. The regeneration process of the present invention is better understood with reference to FIGS. 1 to 7 hereof which show the sequence of regeneration steps that will lead to a relatively low level of waste water discharge and minimum regenerant use. All of these figures show three separate liquid holding areas. The holding area for contaminated water to be treated by ion exchange is designated CW. The holding area for waste water is designated W, and the holding area for the treated water is designated T. These holding areas may be of any suitable type including natural ponds, artificial ponds, and tanks of suitable size. The treated water of course can be released to the environment except for the amounts that are used in ion exchange resin regeneration process. The waste water of the holding area will preferably contain relatively high levels of sodium sulfate decahydrate (Glauber's salt) when sulfuric acid is used as the regenerant.

Figure 1:
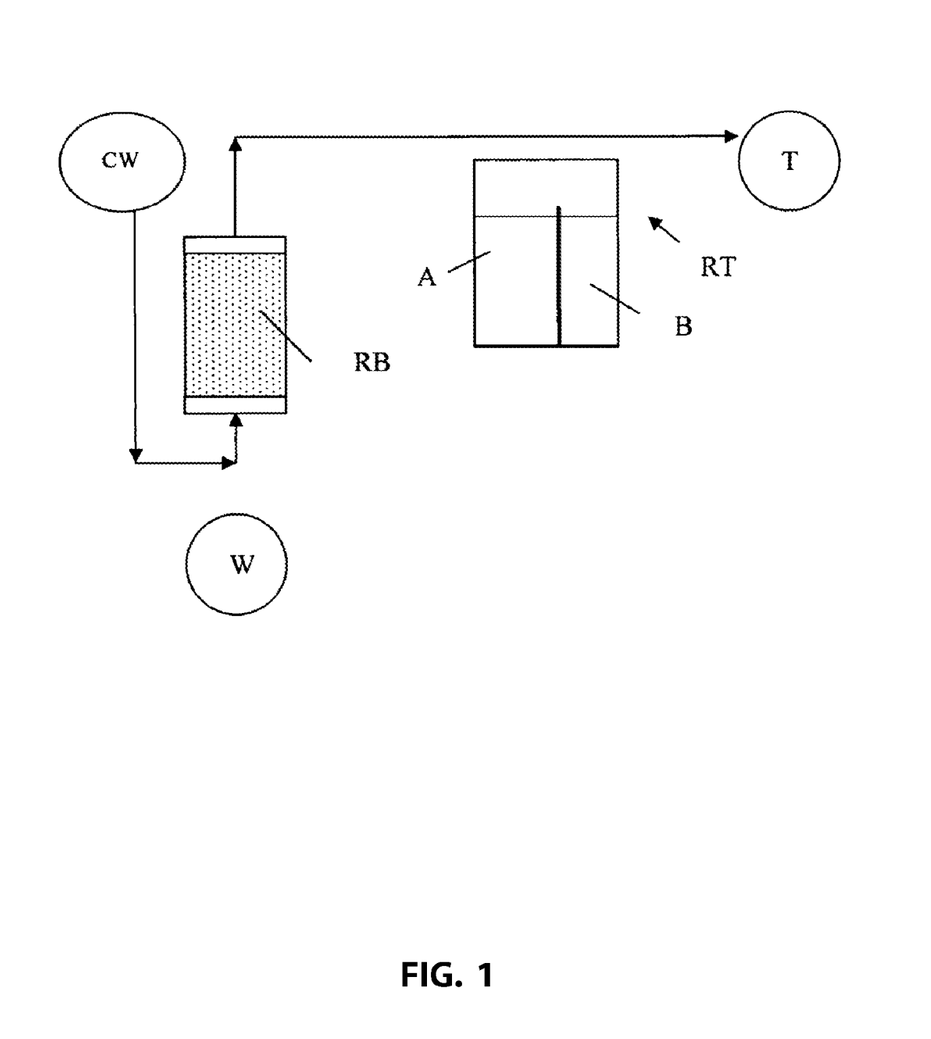
FIGS. 1-7 hereof illustrate a preferred sequence for regenerating the weak acid cation exchange resin bed of the instant invention.
Figure 2:
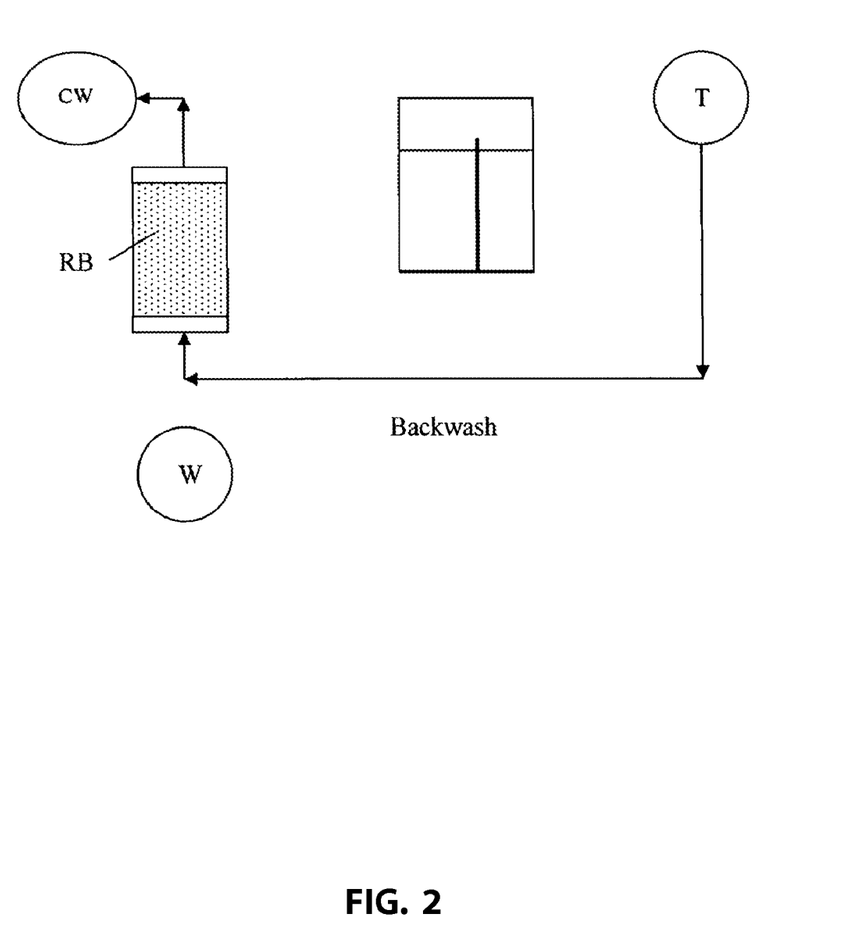

FIG. 1 hereof represents the present invention when the ion exchange resin bed is in service and contaminated water is passed upward through the resin bed and to the treated water holding area T. Once the resin bed becomes exhausted, service is stopped. At this point the resin bed will contain about ⅓ bed volume of contaminated water that has not been ion exchanged. This untreated contaminated water is removed and returned to the contaminated water holding area CW by backwashing the resin bed with an up-flow of an appropriate amount of water from the treated water holding area T, as illustrated by FIG. 2 hereof. This backwash step, which will typically take about 8 to 12 minutes, is important because it not only removes untreated contaminated water from the exhausted resin bed but it also loosen and removes contaminant particulate matter, such as dirt, that will typically be found in the contaminated water. In cases of severe suspended solids loading, it may be necessary to air mix after an initial backwash. This will dislodge suspended solids sticking to the resin beads. The backwash step can then be repeated. Removing these suspended solids is important because if they are not removed from the resin bed, the bed will eventually plug-up and cause problems with water quality and/or throughput. The backwash also redistributes the resin for better flow without channeling.

Figure 3:
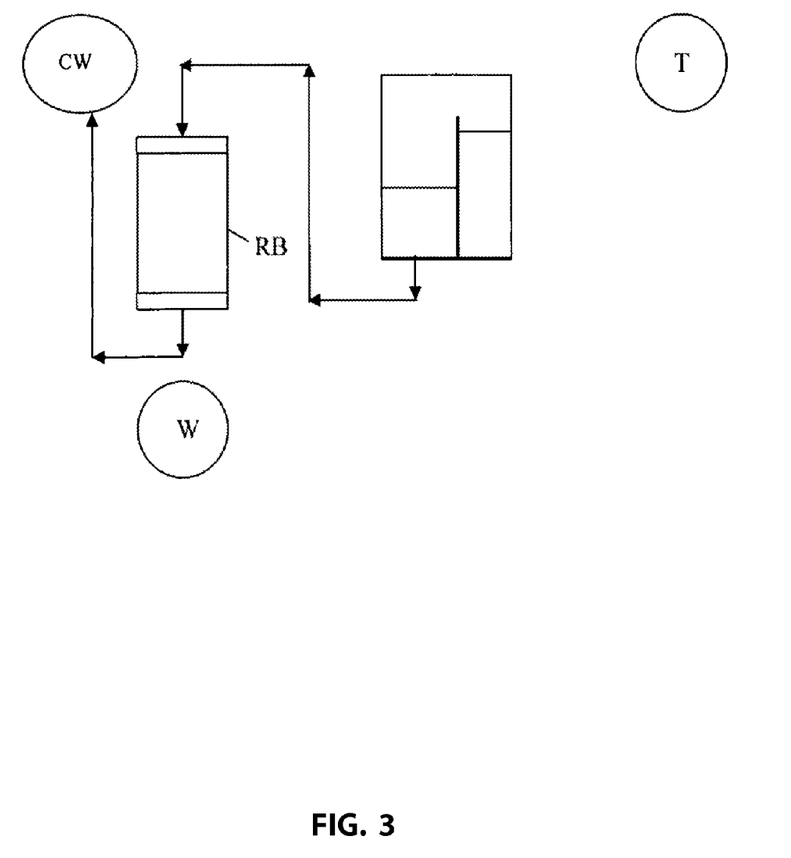
Figure 8:
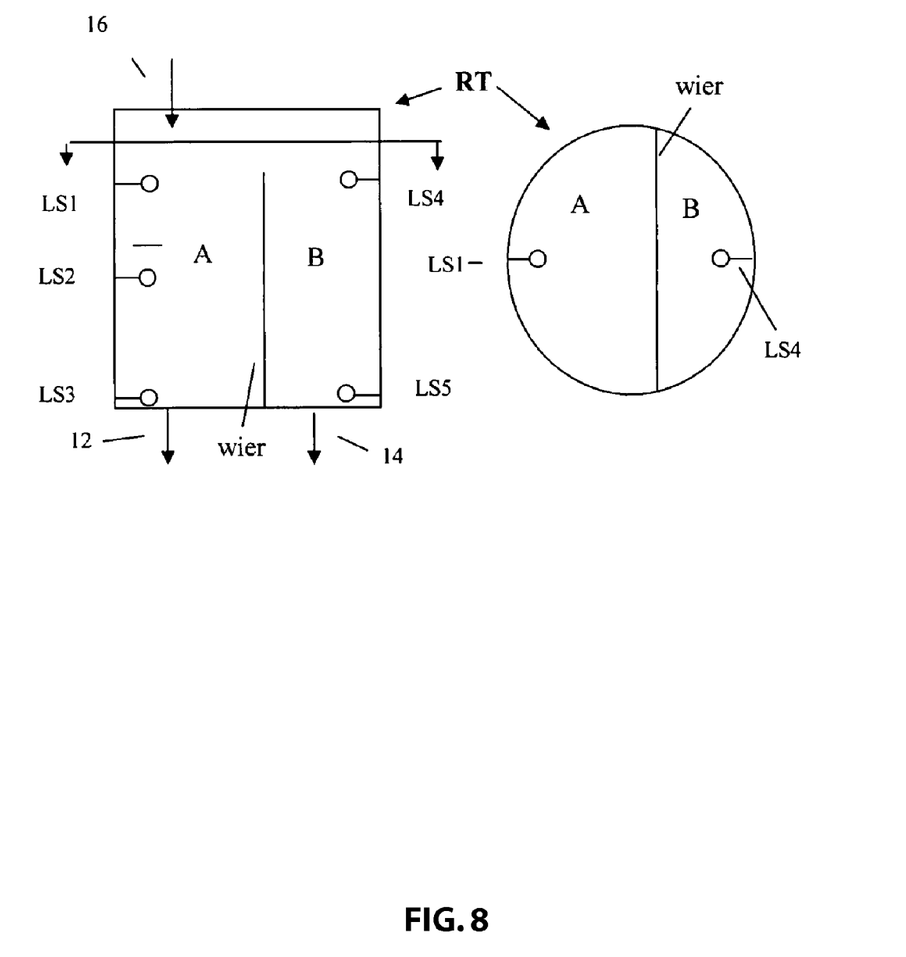
FIG. 8 hereof are views of a preferred acid regenerant solution vessel of the present invention showing level switches as one way of controlling the amount of acid regenerant fed to the resin bed.

The next step in the regeneration procedure is shown in FIG. 3 hereof wherein a dilute stream of a strong acid (regenerant) of effective strength and at a temperature of about 30.degree. C. to about 50.degree. C. is passed through the bed of exhausted ion exchange resin where hydrogen ions from the acid are exchanged for sodium atoms on the resin beads. Although any strong mineral acid can be used in the practice of the present invention hydrochloric acid and sulfuric acid are preferred with sulfuric acid being more preferred. Any strong mineral acid may be used for this step, but 1 N to 2N sulfuric acid is preferred. Although weak acids, such as citric acid and acetic may be used, they are not preferred because they are more expensive and typically less effective than strong acids, producing more waste. It is preferred that the resin bed be washed with the aqueous acid solution for about 15 to about 50 minutes, preferably from about 20 to about 40 minutes. One resin bed volume of regenerant will preferably be used and it will be delivered in three substantially equal one third portions. By "one resin bed volume" is meant that volume in the vessel that is occupied by the ion exchange resin is one bed volume. The figures hereof show a single acid regenerant solution vessel containing two compartments, A and B. Compartment A is the larger compartment and will contain about a ⅔ resin bed volume of acid regenerant solution which will be delivered in two portions of ⅓ bed volume each. FIG. 8 hereof is more detailed simplified illustration of the acid regenerant vessel showing liquid level switches LS1-LS5. Although any suitable means can be used to measure the quantity of acid regenerant solution delivered to the resin bed one preferred means is the use of level switches within the vessel. For example, when the first ⅓ volume is to be delivered from compartment A it will exit from outlet port 12 until the level of acid regenerant solution in the tank reaches level switch LS2 at which time flow will cease. The second ⅓ resin bed volume from compartment A will be delivered until the level of acid regenerant solution reaches level switch LS3 at which time flow will stop. Compartment B will also work the same way. Level switches LS1 and LS4 are used to control the maximum amount of acid regenerant solution in the respective compartments. Make-up acid is introduced into compartment A via line 16.

Figure 4:
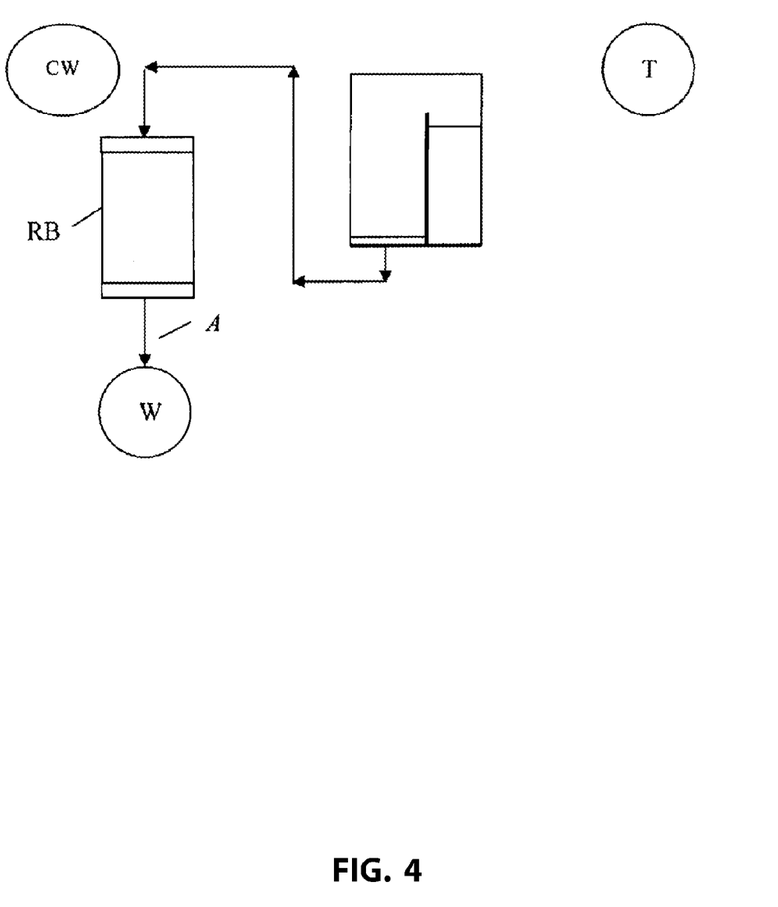
Figure 5:
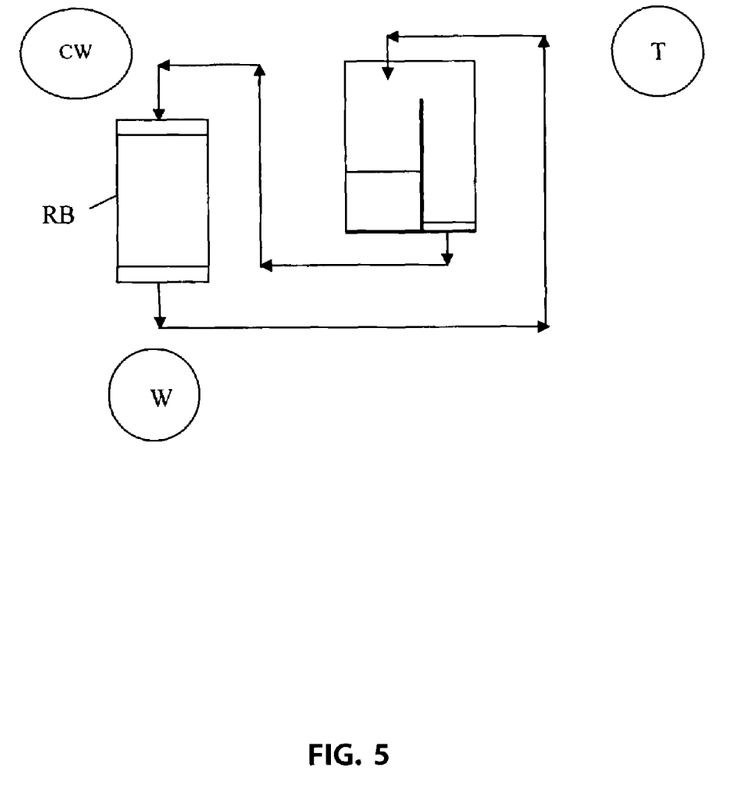
Figure 6:
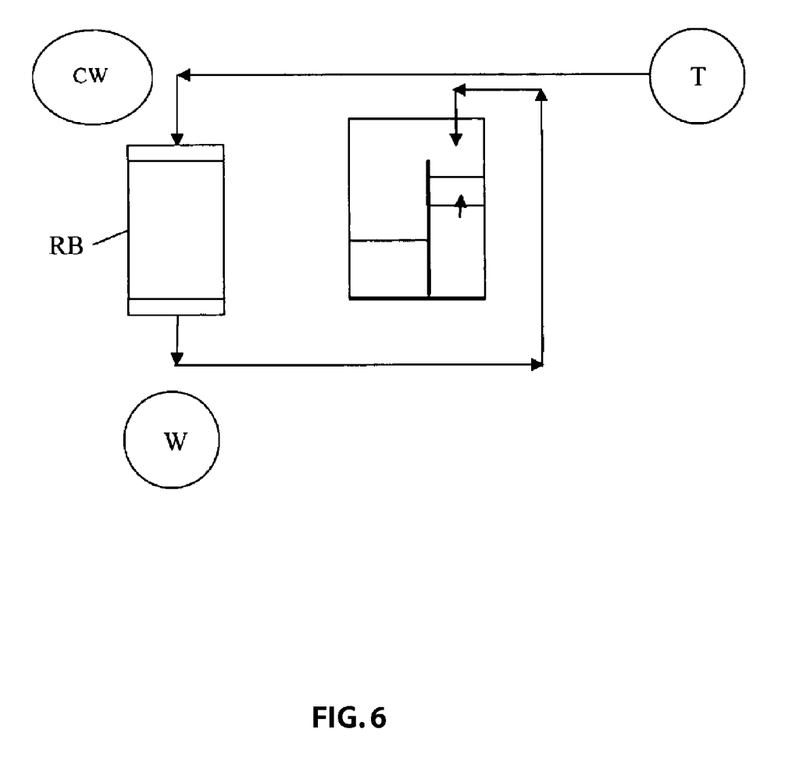
Figure 7:
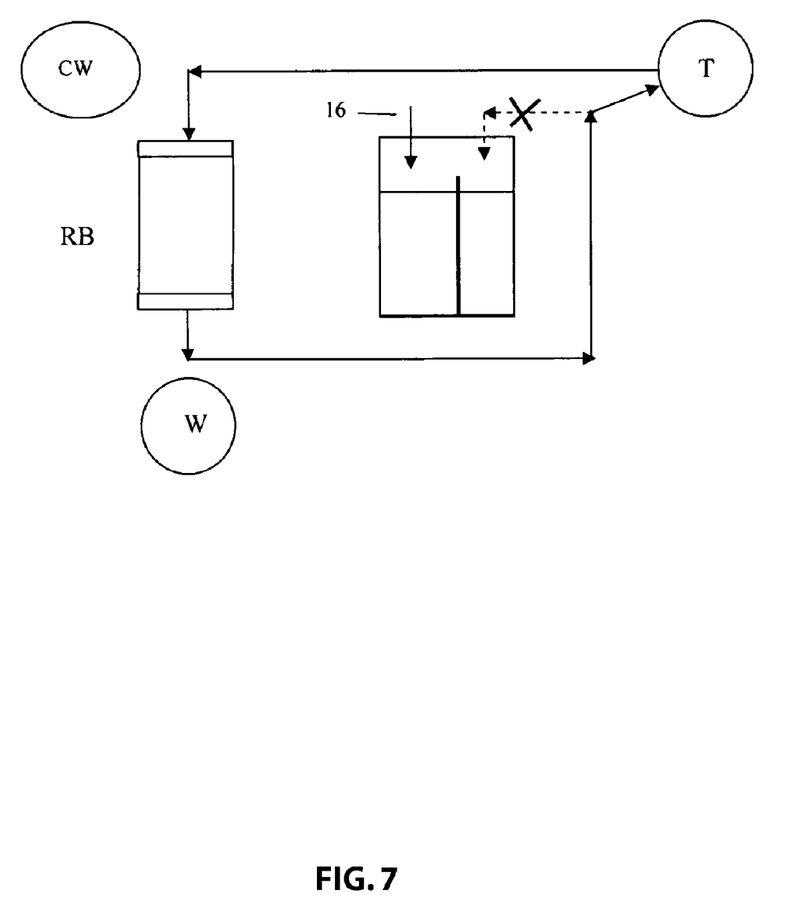

Returning now to FIG. 3, a ⅓ resin bed volume of acid regenerant is conducted from regenerant tank 1 into resin bed RB where it displaces backwash water in resin bed RB. Although the backwash water that originated from treated water holding area T is shown in this figure as being passed from the resin bed to contaminated water holding area CW, but it can also be alternatively recycled to holding area T. This first ⅓ portion A of acid regenerant will exchange hydrogen ions for sodium ions held by the resin beads and thus will become a relatively highly concentrated in sodium. This first ⅓ portion A of regenerant, because it contains a high concentration of sodium contaminant will be passed to waste water holding area W, as shown in FIG. 4 hereof, by displacing it in the resin bed by the second ⅓ portion of acid regenerant B from regenerant holding tank 2. Since most of the sodium from the exhausted resin bed was already exchanged into regenerant portion A and passed to waste water holding area W this second regenerant portion will contain a substantially lower concentration of sodium and thus can be recycled for use in another regenerant cycle. This second ⅓ regenerant portion B which now occupies the voids between resin beads in the resin bed is moved to first acid regenerant holding tank 1 by the third ⅓ portion of regenerant C from holding regenerant holding tank 3. Make-up acid is added to tank 1 to bring the acid regenerant to the predetermined and effective strength. This is shown in FIG. 5 where partially spent regenerant portion B now occupies regenerant tank 1. This third regenerant ⅓ portion C which now occupies the void spaced within the resin bed is substantially free acid having a low level of sodium moieties. This third regenerant portion C is returned to the regenerant holding area and into holding regenerant holding tank 2, as shown in FIG. 6 hereof by passing rinse water from treated holding area T into the vessel holding resin bed RB. A second rinse from holding area T displaces the first rinse in resin bed RB where it is passed to regenerant holding tank 3 as shown in FIG. 7 hereof. It is to be understood that additional rinses can be used as needed. These additional rinses can be recycled to the treated water holding are or they can be passed to the contaminated water holding area.

FIG. 8 is a simple illustration of an alternative acid regenerant feed tank FT. FIG. 8 is a vertical cross-section of a single tank comprised of three sections A, B, and C. Each of these sections will contain ⅓ of a resin bed volume of acid regenerant. Line 10 represents an exit port and associated piping for withdrawing a first ⅓ portion of regenerant from section A and passing it to the vessel containing the resin bed. Lines 1 and 14 represents outlet ports and associated piping for withdrawing acid regenerant portions from sections B and C respectively. Line 16 represents an inlet port and associated piping for recycling acid regenerant from the resin bed. Although this figure only shows one inlet it will be understood that any physical arrangement of piping and ports can be used as long as separate ⅓ regenerant portions can be withdrawn from each section A, B, and C and that recycle regenerant be able to be introduced into section B while regenerant is being removed from section C.

What is claimed is:

1. A method for treating a contaminated water stream contaminated with sodium carbonate, sodium bicarbonate, or both, resulting from the production of coal-bed-methane, which method comprising:
  a) providing at least one reaction vessel containing a bed of weak acid cation ion exchange resin beads of substantially uniform spherical size wherein the volume of said bed of weak acid cation ion exchange resin occupies about half the volume of the reaction vessel between a top header-lateral distributor and a bottom header-lateral distributor and encompassed by surrounding walls of said vessel, and wherein the space between the resin beads is the void volume;
  b) introducing said contaminated water stream, from a contaminated water holding area, into the bottom of said reaction vessel wherein it flows upward through said bottom header-lateral distributor and contacts said ion exchange resin beads at an effective upflow rate sufficient to lift and pack the resin bed against the top header-lateral distributor, and sufficient to result in the exchange of hydrogen ions of the exchange resin for sodium ions of the contaminated water stream, thereby resulting in an ion exchanged treated water stream having a reduced level of sodium ions;
  c) conducting said ion exchanged treated water stream from said reaction vessel to a treated water holding area;
  d) stopping the flow of the contaminated water stream to said reaction vessel when the ion exchange resin becomes substantially exhausted, thereby resulting in said bed of ion exchange resin containing untreated contaminated water within the void volume of the resin bed;
  e) regenerating said bed of weak cation exchange resin by:
    i) backwashing said bed of exhausted weak acid cation exchange resin by introducing an effective amount of water from the treated water holding area into the bottom and through the exhausted weak cation exchange resin thereby displacing said untreated contaminated water within the void volume of said resin bed and suspending particulate impurities and resulting in said resin bed containing uncontaminated treated water;

ii) passing the displaced untreated contaminated water and substantially all suspended particulate impurities back to the contaminated water holding area;

iii) providing an ion exchange resin bed volume of acid regenerant solution in a vessel compartmented such that there is a first compartment containing about ⅔ ion exchange resin bed volume of acid regenerant solution and a second compartment containing about a ⅓ ion exchange resin bed volume of acid regenerant solution, which compartments are separated by a vertically disposed weir within the vessel and wherein each compartment contains an inlet port and an outlet port;

iv) introducing into the top of said reaction vessel and into said backwashed bed of exhausted weak acid ion exchange resin, which contains uncontaminated treated water within the void volume of the resin bed, with a first ⅓ resin bed volume of acid regenerant solution from said first compartment, wherein the acid regenerant solution displaces said uncontaminated treated water in the void volume and exchanges hydrogen ions for sodium ions held by the ion exchange resin, thereby resulting in a first ⅓ resin bed volume of acid regenerant containing a high concentration of sodium;

v) conducting said displaced uncontaminated treated water from the bottom of said reaction vessel to said treated water holding area;

vi) introducing a second ⅓ resin bed volume of acid regenerant solution from said first compartment into the top of said reaction vessel and into said resin bed thereby displacing said first ⅓ resin bed volume of acid regenerant solution held within the void volume of said resin bed, which displaced acid regenerant solution contains a high concentration of sodium;

vii) conducting said displaced first ⅓ acid regenerant solution to a waste water holding area;

viii) introducing a third ⅓ resin bed volume of acid regenerant solution from said second compartment of said acid regenerant vessel into the top of said reaction vessel and into said resin bed thereby displacing said second ⅓ acid regenerant solution which occupies the void volume of the resin bed;

ix) conducting said displaced second ⅓ acid regenerant solution into said first compartment of said acid regenerant vessel;

x) introducing a ⅓ resin bed volume of a displacement rinse from said treated water holding area into the top of said reaction vessel and into said resin bed thereby displacing said third ⅓ resin bed volume of acid regenerant that occupied said void volume of the resin bed;

xi) conducting said displaced third ⅓ resin bed volume of acid regenerant to said second compartment of said acid regenerant vessel;

xii) introducing additional ⅓ resin bed volumes of rinse water from said treated water holding area into the top of said reaction vessel and through said resin bed until said resin bed is substantially free of acid regenerant solution;

xiii) restarting the upflow of contaminated water through said regenerated resin bed;

xiv) introducing make-up acid into said first compartment of said acid regenerant solution vessel of sufficient strength and quantity to bring the acid regenerant in said first compartment to a predetermined strength and level for the next regeneration cycle; and xv) repeating steps d and e whenever the resin bed becomes exhausted.

2. The method of claim 1 wherein the acid regenerant is selected from the group consisting of citric acid, acetic acid, hydrochloric acid, and sulfuric acid.

3. The method of claim 2 wherein the acid regenerant is selected from hydrochloric acid and sulfuric acid.

4. The method of claim 3 wherein the acid regenerant is sulfuric acid.

5. The method of claim 4 wherein the waste water stream has a high concentration of sodium sulfate decahydrate.

6. The method of claim 1 wherein the weak acid cation resin is produced from an acrylic polymer crosslinked with divinyl benzene and functionalized with carboxylic acid exchange groups.

7. The method of claim 6 wherein the weak acid cation resin is in the form of substantially uniform beads having diameters in size range of about 16 US mesh to about 70 US mesh.

8. The method of claim 1 wherein the weak acid cation resin is comprised of a solid core having a porous outer surface.

9. The method of claim 1 wherein the acid regeneration vessel is operated at a temperature of about 30° to about 50° C.

* * * * *